(12) United States Patent
Murata et al.

(10) Patent No.: US 7,396,033 B2
(45) Date of Patent: Jul. 8, 2008

(54) MOTORCYCLE WITH AUXILIARY SUPPORT

(75) Inventors: Yutaka Murata, Wako (JP); Yukiya Ueda, Wako (JP); Yasuji Hashimoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 447 days.

(21) Appl. No.: 11/034,966

(22) Filed: Jan. 14, 2005

(65) Prior Publication Data
US 2005/0167961 A1    Aug. 4, 2005

(30) Foreign Application Priority Data
Jan. 30, 2004   (JP)   .............................. 2004-024046

(51) Int. Cl.
*B62H 7/00*   (2006.01)

(52) U.S. Cl. .................. 280/293; 280/763.1; 280/764.1

(58) Field of Classification Search ................. 180/209, 180/219, 282; 280/288.4, 293, 730.1, 298, 280/301, 304, 763.1, 755, 764.1, 770, 765.1, 280/766.1; 254/423
See application file for complete search history.

(56) References Cited

U.S. PATENT DOCUMENTS

| | | | | |
|---|---|---|---|---|
| 2,835,499 A | * | 5/1958 | Claes et al. ..................... | 280/8 |
| 4,185,670 A | * | 1/1980 | Sartell, Jr. ..................... | 141/94 |
| 4,637,624 A | * | 1/1987 | Shur .......................... | 280/298 |
| 4,691,798 A | * | 9/1987 | Engelbach ................... | 180/209 |
| 4,961,477 A | * | 10/1990 | Sweeney ..................... | 180/219 |
| 5,029,894 A | * | 7/1991 | Willman ..................... | 280/755 |
| 5,118,126 A | * | 6/1992 | Yaple ......................... | 280/293 |
| 5,931,493 A | * | 8/1999 | Sutherland ............... | 280/730.1 |
| 5,984,337 A | * | 11/1999 | Dubin ........................ | 280/293 |
| 6,213,237 B1 | * | 4/2001 | Willman ..................... | 180/209 |
| 6,386,576 B1 | * | 5/2002 | Kamen et al. ............ | 280/728.1 |
| 6,394,738 B1 | * | 5/2002 | Springer ..................... | 414/673 |
| 2004/0256835 A1 | * | 12/2004 | Royal et al. ................. | 280/293 |

FOREIGN PATENT DOCUMENTS

| | | |
|---|---|---|
| JP | 2-53683 | 2/1990 |
| JP | 4-317882 | 11/1992 |

* cited by examiner

*Primary Examiner*—Eric Culbreth
*Assistant Examiner*—Barry Gooden, Jr.
(74) *Attorney, Agent, or Firm*—Westerman, Hattori, Daniels & Adrian, LLP.

(57) ABSTRACT

A motorcycle includes at least a first auxiliary member mounted on a body of the motorcycle for contacting a road and providing assistance to the motorcycle body to support itself, when necessary, and a second auxiliary member mounted on the motorcycle body, wherein the second auxiliary member is inflatable, in order to contact the road to support the motorcycle body, in addition to the first auxiliary member.

12 Claims, 5 Drawing Sheets

MOTORCYCLE WITH AUXILIARY SUPPORT

FIELD OF THE INVENTION

The present invention relates to a motorcycle with auxiliary support members. More specifically, it relates to first and second auxiliary support members used on a motorcycle.

RELATED ART

Nowadays, even handicapped people ride a motorcycle. They ride a motorcycle not only to move but also to enjoy it as a sport.

When a motorcycle stops or is going to stop, it is difficult for the motorcycle to support itself with front and rear wheels alone.

Then, a normal person puts his/her foot on the road right before he/she stops the motorcycle or while he/she stops the motorcycle to enable the motorcycle body to support itself. However, a handicapped person who has lost the use of his/her legs cannot put his/her foot on the road. A motorcycle which can be driven even by a handicapped person who has lost the use of his/her legs alone has been developed (see JP-A No. 53683/1990 and JP-A No. 317882/1992). An auxiliary wheel separate from the front and rear wheels contacts the road to enable the motorcycle body to support itself. The motorcycle body is supported at three or more points from the road due to this auxiliary wheel, thereby making it possible for the motorcycle body to support itself. The above auxiliary wheel is driven by the engine or the power of a storage battery.

Therefore, in this type of motorcycle, a handicapped person feels uneasy when the engine stops all of the sudden or trouble occurs in the electric system. In addition, when he/she is getting off the motorcycle body (or simply: body) after he/she stops it, he/she needs a wheelchair mounted on the motorcycle, unlike a normal person.

SUMMARY OF THE INVENTION

It is an object of the present invention which has been made in view of the above situation to provide a motorcycle which assists its body in supporting itself in an emergency where an auxiliary wheel does not project from the motorcycle to assist its body in supporting itself for some reason or other when a handicapped person who has lost the use of his/her legs drives it and enables him/her to take out a wheelchair mounted on the body.

To attain the above object, the present invention provides the following means. The invention as illustrated in FIG. 1 is a motorcycle including first auxiliary members (for example, outriggers A and B in an embodiment) which contact the road (for example, road R in the embodiment) to assist its body (for example, motorcycle body 10 in the embodiment) in supporting itself when necessary, besides front and rear wheels (for example, wheels 14 and 16 in the embodiment), wherein the motorcycle further includes a second auxiliary member (for example, secondary member 30 or 40 (see FIG. 3) in the embodiment) which inflates or expands itself to contact the road, in addition to the first auxiliary members.

In the motorcycle of this invention, even in the above-described emergency, the motorcycle body receives support force from the road to be assisted in supporting itself, besides the front and rear wheels. Therefore, the motorcycle body can support itself. That is, the auxiliary wheels can be supported with a simple structure.

According to another embodiment the invention, there is provided a motorcycle, wherein a wheelchair can be mounted on the body (for example, body 60 in the embodiment) and the second auxiliary member is arranged on the wheelchair mounted side of the body.

In the motorcycle of this invention, the second auxiliary member on the wheelchair mounted side is inflated to contact the road so as to receive support force from the road, whereby the body is assisted in supporting itself. That is, it is possible to prevent the body from falling toward the wheelchair side. Therefore, even in the above-described emergency, the rider can get off the motorcycle by taking out the wheelchair by himself/herself.

Further, there is provided a motorcycle as described above, wherein the second auxiliary member can be inflated or expanded by gas.

In the motorcycle of this invention, gas is not injected into the above second auxiliary member in a normal state which does not require inflation. Therefore, the above second auxiliary member becomes light in weight and not bulky but compact when it is stored, thereby reducing restrictions on mounting space.

Additionally, there is provided a motorcycle as described above wherein the second auxiliary member is sandwiched between plate-like members (for example, plate-like members 32 and 42 in the embodiment of FIGS. 1 and 3) which can contact the road to be formed like bellows and combined together by belt-like members (for example, belt-like members 33 and 43 in the embodiment) which are put between the plate-like members.

In the motorcycle of this invention, as the second auxiliary member is formed like bellows, it is light in weight, can be easily folded when it is not inflated in a normal state and can be compact when it is stored. Further, as it is sandwiched between the plate-like members by the belt-like members, the support rigidity of the second auxiliary member itself is improved. Therefore, it does not impair the appearance of the motorcycle and can improve support force even when it contacts the road.

According to the invention described above, there is provided a motorcycle, wherein a plate-like member (for example, the lowermost plate 34 or 44 in the embodiment of FIGS. 1 and 3) which contacts the road out of the plate-like members (for example, plate-like members 32b or 42b in the embodiment) is curved upward toward the forward direction of the body.

In the motorcycle of this invention, the above plate-like members function like a camber and do not collide with the road while running. Therefore, the second auxiliary member can slide smoothly over the road and can inflate the second auxiliary member even while running.

Further, according to the invention described above, there is provided a motorcycle, wherein the plate-like member which contacts the road is molded out of a resin.

In the motorcycle of this invention, the above second auxiliary member inflates and the lower plate portion is rubbed with the road, the friction of the resin is lower than that of a metal. Therefore, the above second auxiliary member can slide smoothly over the road and can be inflated even while running. As the second auxiliary member is made of a resin, it is easily processed.

The motorcycle according to the present invention can assist its body in supporting itself in an emergency where the body is not assisted in supporting itself when a handicapped person who has lost the use of his/her legs rides it and enables him/her to take out a wheelchair mounted on the body.

BRIEF DESCRIPTION OF THE DRAWINGS

A preferred embodiment of the present invention will be described with reference to the accompanying drawings, wherein.

DETAILED DESCRIPTION OF THE INVENTION

Figure 1:
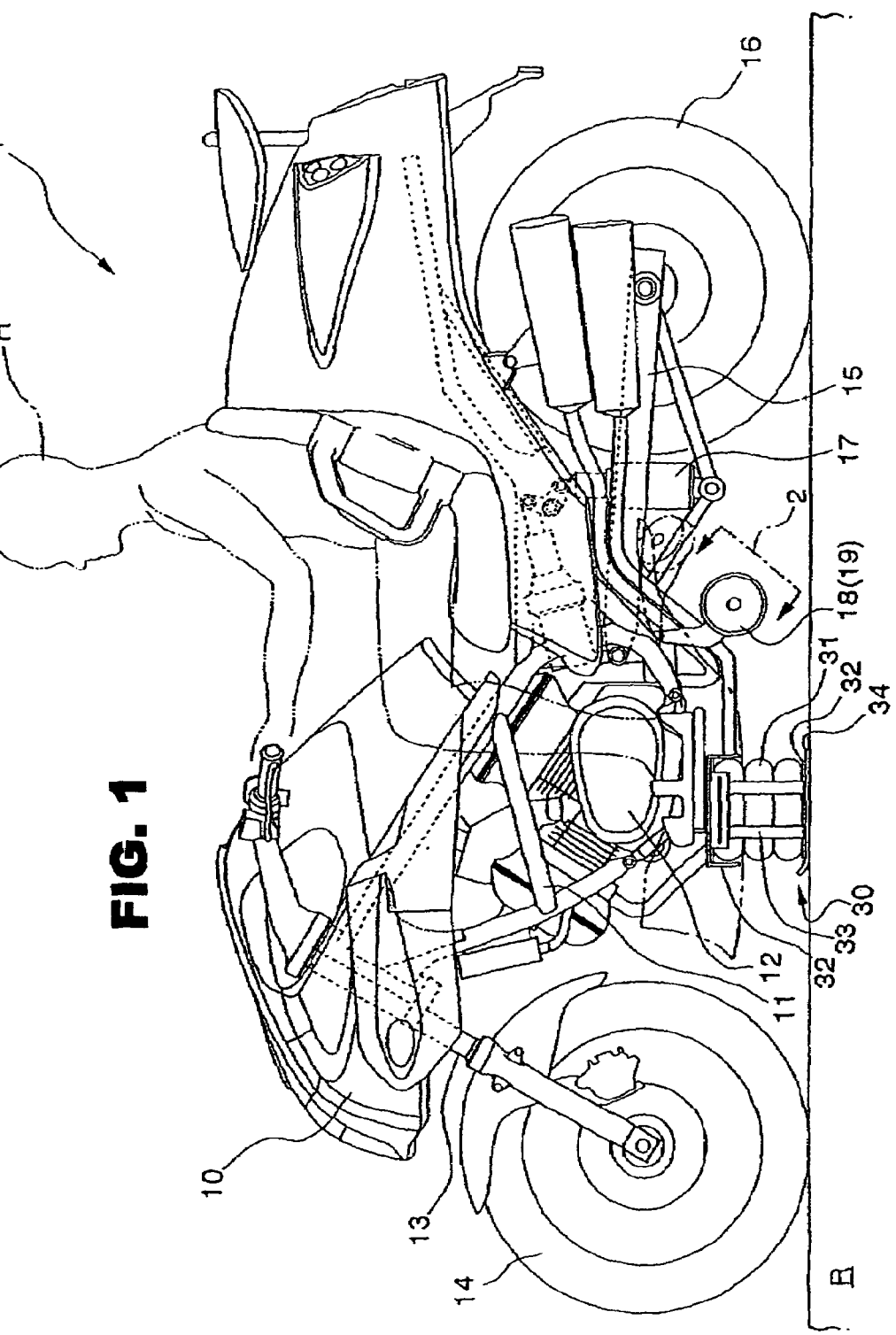
FIG. 1 is a side view of a motorcycle according to the present invention.

As shown in FIG. 1, the motorcycle 1 in this embodiment can be driven even by a handicapped person who has lost the use of his/her legs by injury or the like. Motorcycle 1 has an engine 12 within a frame 11. A front wheel 14 is connected to the front portion of the frame 11 by a front fork 13, and a rear wheel 16 is connected to the rear portion of the frame 11 by rear arms 15 like an ordinary motorcycle. Reference H denotes a rider.

The front fork 13 incorporates a telescopic suspension mechanism, not shown. The proximal ends of the rear arms 15 are movably journaled to the frame 11 and a cushion unit 17 is interposed between the frame 11 and the rear arms 15 to constitute a link type suspension mechanism.

Figure 2:
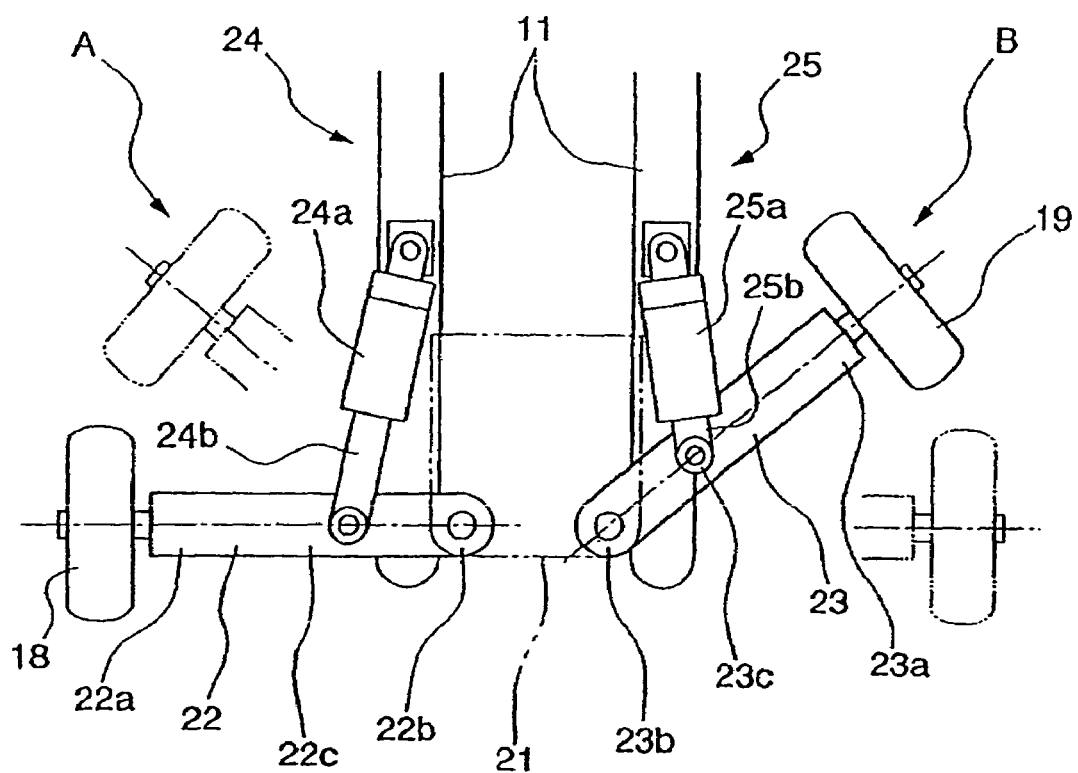
FIG. 2 is a front view of the driving mechanism of the outriggers (first auxiliary members) along section 2-2 of FIG. 1.

Two auxiliary wheels 18 and 19 which contact the road when necessary are provided separately on both sides of the body (part considered as integrated with the frame 11) at the rear of the engine 12 below the frame 11, besides the front and rear wheels 14 and 16. As shown in FIG. 2, a bracket 21 is installed between the two parallel frames 11 in such a manner that it projects downward from the body 10.

A wiping arm 22 for supporting the auxiliary wheel 18 is connected to one end of the bracket 21 in such a manner that it can move in the width direction of the body. A wiping arm 23 for supporting the auxiliary wheel 19 is connected to the other end of the bracket 21 in such a manner that it can move in the width direction of the body like the above wiping arm 22. The arms 22 and 23 fitted with the auxiliary wheels 18 and 19 will be referred to as "outriggers A and B", respectively.

The auxiliary wheel 18 is movably connected to one end 22a projecting in the left direction of the body of the wiping arm 22 and the other end 22b of the wiping arm 22 is movably journaled to the bracket 21. A hydraulic cylinder 24 for moving the wiping arm 22 is linked to the intermediate portion 22c of the wiping arm 22. The proximal end of the cylinder 24a of the hydraulic cylinder 24 is movably connected to one frame 11 and the distal end of the piston rod 24b is movably connected to the intermediate portion 22c of the wiping arm 22.

The outrigger A provided on the left side of the body is stored in such a manner that it is folded upward by retracting the piston rod 24b of the hydraulic cylinder 24 into the cylinder 24a, lowered by projecting the piston rod 24 from the cylinder 24a and contacts the road R according to the disposition of the body with respect to the road or the running speed.

The auxiliary wheel 19 is movably connected to one end 23a projecting in the right direction of the body of the wiping arm 23 and the other end 23b is movably supported on the bracket 21. A hydraulic cylinder 25 for moving the wiping arm 23 is connected to the intermediate portion 23c of the wiping arm 23. The proximal end of the cylinder 25a of the hydraulic cylinder 25 is movably connected to the other frame 11 and the end of the piston rod 25b is rotatably connected to the intermediate portion 23c of the wiping arm 23.

The outrigger B provided on the right side of the body is stored in such a manner that it is folded upward by retracting the piston rod 25b of the hydraulic cylinder 25 into the cylinder 25a, lowered by projecting the piston rod 25b from the cylinder 25a and contacts the road R according to the disposition of the body with respect to the road or the running speed (when the motorcycle stops, the outriggers A and B are both lowered).

The above outriggers A and B correspond to the auxiliary members (first auxiliary members) of the present invention and contact the road R to assist the motorcycle body 10 in supporting itself when necessary. The above outriggers A and B are activated by the forward and backward movements of the piston rods of the hydraulic cylinders 24 and 25, respectively. The hydraulic cylinders 24 and 25 of the motorcycle of the present invention are driven under control of a controller, not shown. The controller is activated by electricity supplied from a storage battery.

Figure 3:
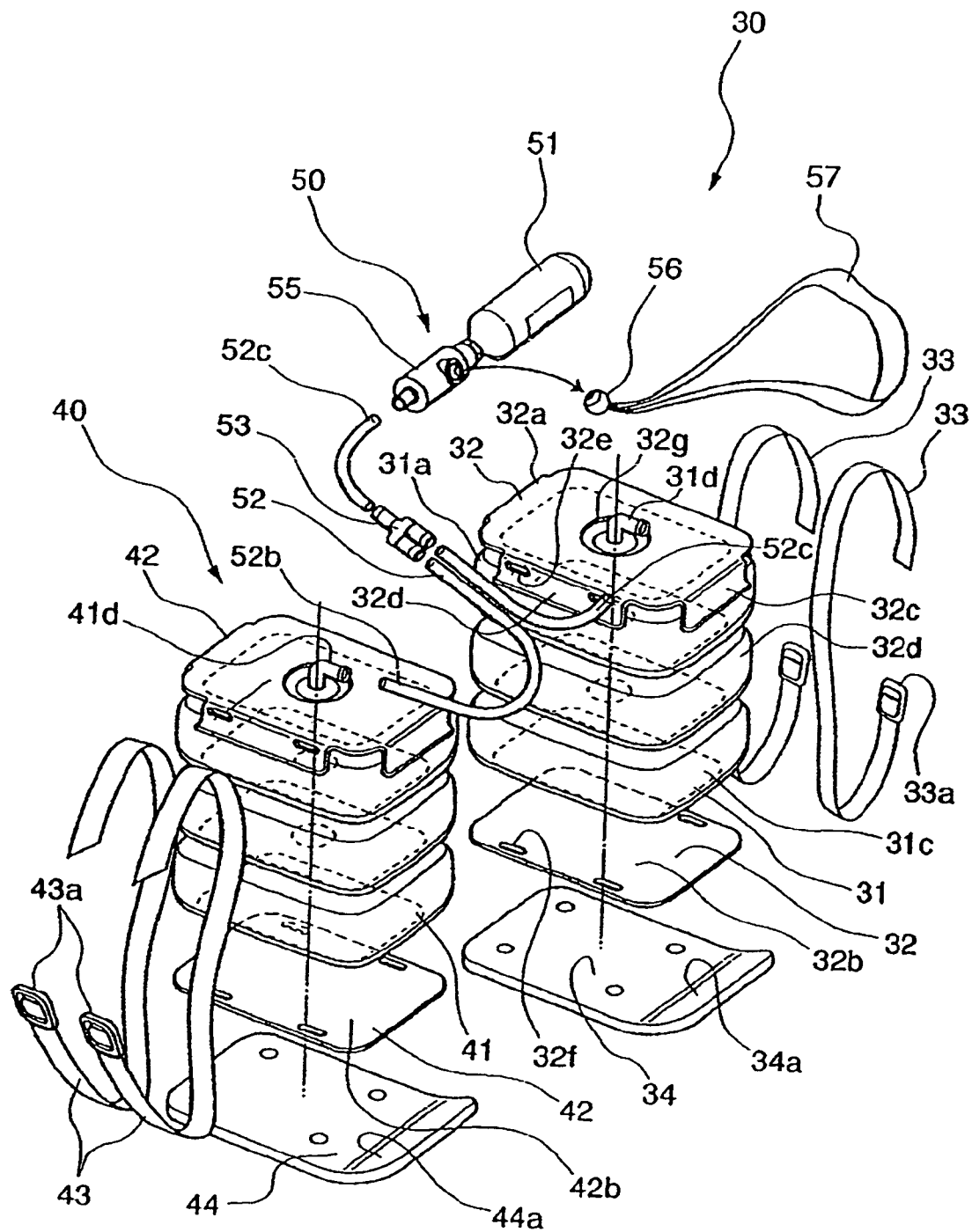
FIG. 3 is an exploded perspective view of second auxiliary members.

The second auxiliary members of the motorcycle 1 of the present invention will be described with reference to FIG. 1 and FIG. 3. The second auxiliary members in this embodiment are provided to assist the motorcycle in supporting itself in an emergency. The auxiliary members 30 and 40 are provided in a pair, one on each side of the body 10 near the feet of the rider. Since the above second auxiliary members 30 and 40 are the same in constitution, the second auxiliary member 30 will be described. The reason that the second auxiliary members 30 and 40 are provided in a pair is to assist the body 10 in supporting itself from right and left sides.

The second auxiliary members 30 and 40 (second auxiliary member 40 being on the right side when seen from the front of the body) include bellows members 31 and 41 which are inflated or enlarged by injecting gas, plate-like members 32 and 42 for sandwiching the above bellows members 31 and 41 and belt-like members 33 and 43 which are put between the above plate-like members 32 and 42 to combine the above bellows members 31 and 41 together, respectively (reference numerals for the second auxiliary member 40 will be omitted hereinafter).

The above bellows member 31 is composed of a known PVC coated polyester ground fabric and consists of an upper air bag 31a, intermediate air bag 31b and lower air bag 31c. An intake port 31d is formed in the upper air bag 31a to inject gas into the air bags. A hole is formed at the interface between them so that when gas is injected into the upper air bag 31a, not only the upper air bag 31a but also the intermediate air bag 31b and the lower air bag 31c are inflated and expanded, thereby making it possible to communicate gas therebetween. Before the injection of gas, the above bellows member 31 is folded and stored.

The above plate-like members 32 consist of an upper plate 32a and a lower plate 32b for sandwiching the above bellows member 31 therebetween. The above upper plate 32a and the lower plate 32b are parallel to the road R and made of an aluminum alloy. A circular hole 32g is formed in the upper plate 32a so that the above intake port 31d projects from the top of the upper plate 32a. The above upper plate 32a has side walls 32c and 32d formed by bending down its end portions in the longitudinal and transverse directions, and holes 32e for accepting the belt-like members 33 are formed in the projecting side wall 32d of the end portion in the transverse direction.

Holes 32f for accepting the belt-like members 33 are also formed in the end portion in the transverse direction of the above lower plate 32b. The belt-like members 33 are made of nylon and shaped like a belt and belt metal fittings 33a are detachably attached to opposing ends of the belt-like members 33. The above belt-like members 33 are inserted into the holes 32e and 32f of the upper plate 32a and the lower plate 32b and put from the top plate 32a to the lower plate 32b to sandwich the bellows member 31 therebetween. The above second auxiliary member 30 is thus supported to have improved support rigidity and contacts the road R.

The second auxiliary members 30 and 40 of this embodiment have the lowermost plates 34 and 44 which are molded out of a resin below the lower plate 32b, respectively. The lowermost plates 34 and 44 are molded out of a known resin and the ends in the front direction of the body 10 of the lowermost plates 34 and 44 have curved portions 34a and 44a which are curved upward, respectively. The above lowermost plates 34 and 44 are bonded to the lower plates 32b and 42b, respectively. Although the above lowermost plates 34 and 44 of this embodiment are bonded to the above lower plates 32b and 42b, respectively, the present invention is not limited to this. The lower plates 32b ad 42b may be molded out of a resin or coated.

A description is subsequently given of a gas feed member 50 for injecting gas into the second auxiliary members 30 and 40. The above gas feed member 50 comprises an air cylinder 51 filled with compressed air (gas), air tube 52 which is an air feed line, and feed opener 55 for starting the feed of air. The air cylinder 51 of this embodiment is a small-sized air cylinder filled with compressed carbon dioxide. Not shown, it is secured to the frame 11 or the like of the body 10. The air tube 52 is a pressure air tube having excellent pressure resistance and comprises a forked air tube joint 53 at an intermediate position to inject air into the right and left second auxiliary members 30 and 40. The end 52a of the forked air tube 52 is connected to the intake port 31d of the above bellows member 31, the end 52b is connected to the intake port 41d of the above bellows member 41, and the end 52c is connected to the feed opener 55.

The feed opener 55 of this embodiment is a spring type opener. Not shown, a valve and a spring are incorporated in the above feed opener 55 so that the valve is closed by the elastic force of the spring. While the valve of the feed opener 55 is closed, air is not supplied from the air cylinder 51 and while the valve is open, air is supplied. The above feed opener 55 is provided with an engagement member 56 so that when the engagement member 56 is disconnected from the above feed opener 55, the closed valve is opened. The engagement member 56 is provided with a grip portion 57 so that when the rider H pulls the grip portion 57, the feed opener 55 and the engagement member 56 are disconnected from each other. The grip portion 57 is installed within the reach of the rider H so that it can be pulled out easily by the rider H in an emergency.

Figure 4:
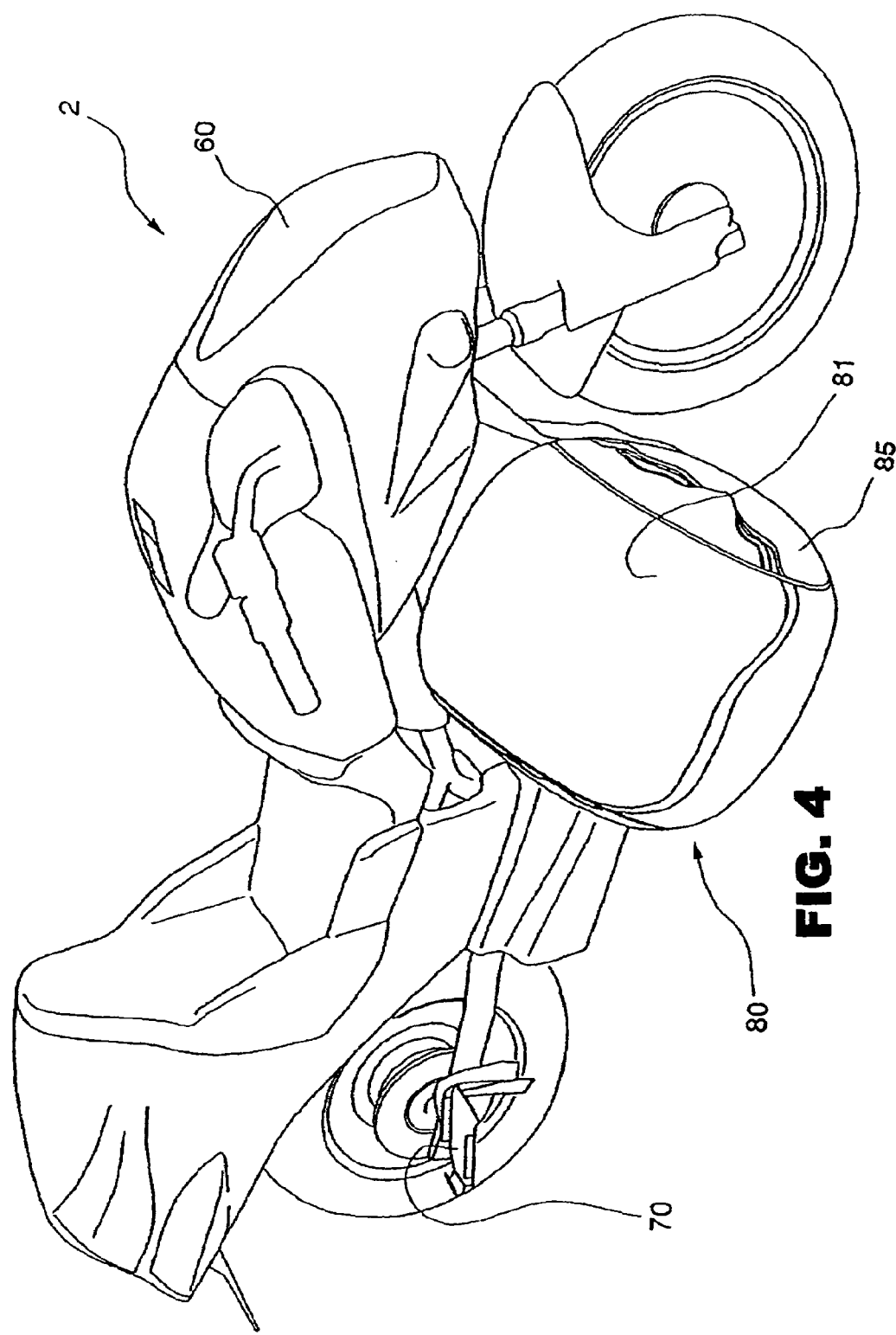
FIG. 4 is a perspective view of another embodiment provided with a second auxiliary member on a wheelchair mounted side (carrier side)
Figure 5A:
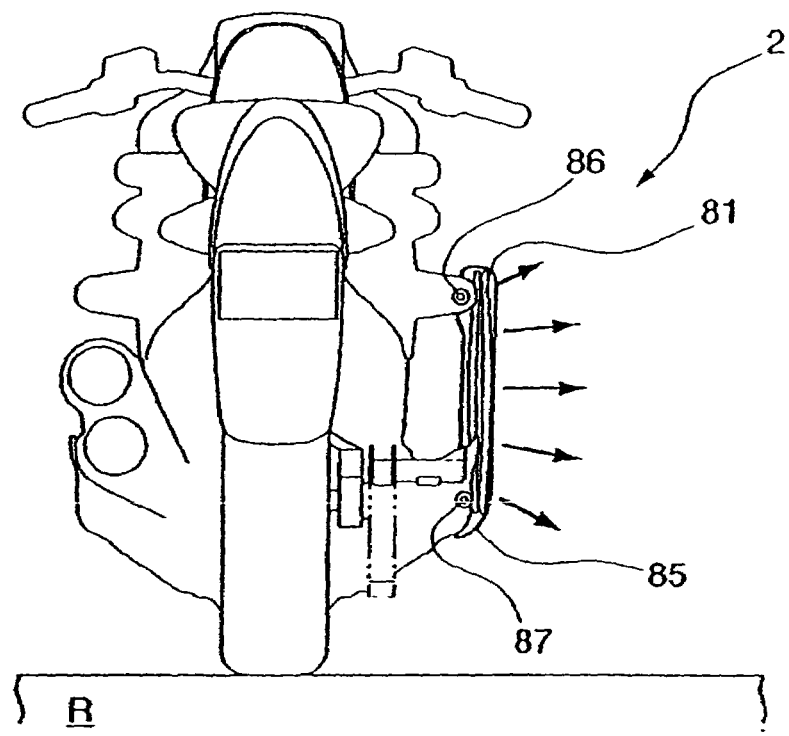
FIGS. 5(a) and 5(b) are front views of the motorcycle shown in FIG. 4.
Figure 5B:
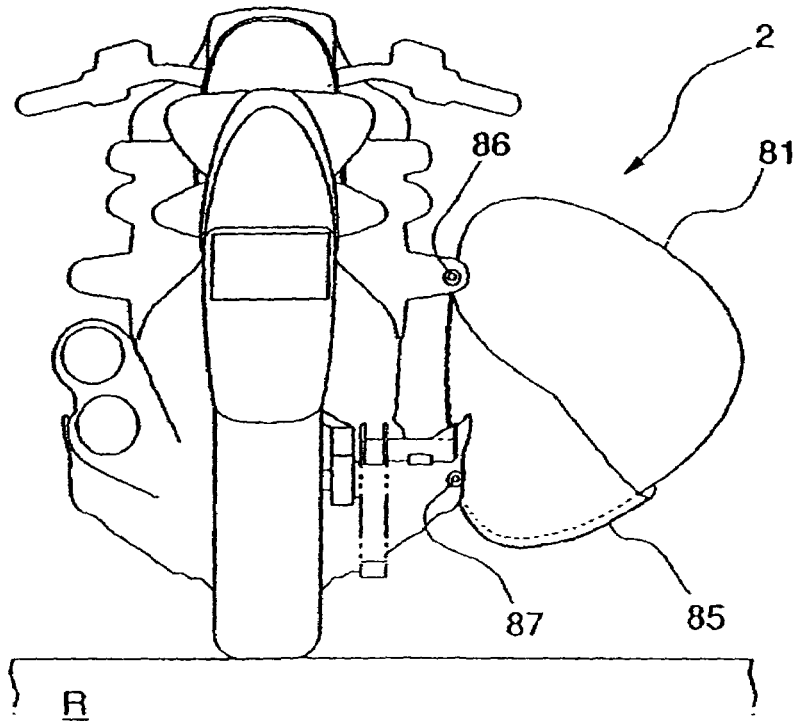

Another embodiment of the present invention will be described with reference to FIG. 4 and FIGS. 5(a) and 5(b). FIG. 4 is a perspective view of a motorcycle when a second auxiliary member is inflated or expanded, FIG. 5(a) is a front view of the motorcycle when the second auxiliary member is inflated or expanded, and FIG. 5(b) is a front view of the motorcycle when the second auxiliary member is stored.

The motorcycle 2 shown in FIG. 4 of this embodiment mounts a wheelchair on the body 60. The above motorcycle 2 is constituted the same as a normal motorcycle like the motorcycle 1 of the above embodiment. The motorcycle 2 is provided with a carrier 70 for mounting a folded wheelchair on the right side of the rear wheel 65 at the rear of the body 60. The above motorcycle 2 has the second auxiliary member 80 on the carrier 70 side on which the above wheelchair is mounted. The above second auxiliary member 80 is provided to assist the motorcycle 2 in supporting itself in an emergency like the above second auxiliary members 30 and 40 and inflates itself to contact the road, thereby assisting the body in supporting itself.

The above second auxiliary member 80 is composed of an air bag 81. The above air bag 81 is made of a known PVC coated polyester ground fabric and inflated by injecting air in order to contact the road R like the above bellows members 31 and 41. The air bag 81 is inflated like a vertical rice ball, measuring 500 mm in the lengthwise direction, 500 mm in the width direction and 600 mm in the height direction of the body as shown in FIG. 4 and FIG. 5(b) when seen from the front of the body. The air bag 81 is folded and stored as shown in FIG. 5(a) in a normal state.

The above auxiliary member 80 is provided with a case member 85. The above case member 85 is used to store the folded air bag 81 as shown in FIG. 5(a) in a normal state and attached to the above motorcycle 2 by case fixing portions 86 and 87. The case member 85 is unfolded together with the inflation of the air bag 81 as shown in FIG. 5(b) in an emergency to hold the lower portion of the air bag 81. Therefore, when the motorcycle 2 is falling toward the carrier side, the case member 85 contacts the road supported by the air bag 81 to assist the body 60 in supporting itself. Even in this embodiment, air (gas) is supplied by a feed member similar to that of the above embodiment.

The technical scope of the invention is not limited to the above embodiments and various modifications may be made in the invention without departing from the spirit and scope of the invention.

For example, the inflated bellows member 31 and the dilated air bag 81 are not limited to the illustrated shapes and their sizes may be suitably changed. The used materials is not limited to those described above and may be suitably selected.

In this detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

We claim:

1. A motorcycle, comprising:
   at least a first auxiliary member mounted on a body of the motorcycle for contacting a road and providing assistance to the motorcycle body to support itself, when necessary; and
   a second auxiliary member mounted on the motorcycle body, said second auxiliary member being inflatable, in order to contact the road to support the motorcycle body, in addition to said first auxiliary member; and
   a wheelchair carrier for mounting a folded wheel chair on one side of the motorcycle body, wherein said second auxiliary member is disposed on said one side of the motorcycle body.

2. A motorcycle according to claim 1, further comprising two first auxiliary members.

3. The motorcycle, according to claim 1, wherein said second auxiliary member is inflatable by gas.

4. The motorcycle, according to claim 1, wherein said second auxiliary member is inflatable by gas.

5. A motorcycle, comprising:
- at least a first auxiliary member mounted on a body of the motorcycle for contacting a road and providing assistance to the motorcycle body to support itself, when necessary; and
- a second auxiliary member mounted on the motorcycle body, said second auxiliary member being inflatable, in order to contact the road to support the motorcycle body, in addition to said first auxiliary member; and
- wherein said second auxiliary member includes a lower plate member for contacting the road.

6. The motorcycle, according to claim 5, wherein said second auxiliary member includes an inflatable bellows disposed above said lower plate member.

7. The motorcycle according to claim 6, wherein said second auxiliary member further includes an upper plate formed on top of said inflatable bellows.

8. The motorcycle, according to claim 7, further comprising at least a belt member tying together said lower plate member, said inflatable bellows, and said upper plate.

9. The motorcycle, according to claim 5, wherein said lower plate is curved upward on one side thereof, in the forward direction of the motorcycle body.

10. The motorcycle according to claim 5, wherein said lower plate is formed of a resin.

11. The motorcycle according to claim 1, further comprising an additional second auxiliary members, one each, of said second auxiliary members, disposed on an opposite side of the motorcycle body.

12. A motorcycle, comprising:
- at least a first auxiliary member mounted on a body of the motorcycle for contacting a road and providing assistance to the motorcycle body to support itself, when necessary;
- a pair of second auxiliary members mounted on the motorcycle body, said second auxiliary members disposed on opposite sides of the motorcycle body and being inflatable, in order to contact the road to support the motorcycle body, in addition to said first auxiliary member,
- wherein each of said second auxiliary members includes a lower plate member for contacting the road, an inflatable bellows formed above said lower plate member, an upper plate formed on top of said inflatable bellows, and at least a belt member tying together said lower plate member, said inflatable bellows and said upper plate.

\* \* \* \* \*